United States Patent
Maul et al.

(10) Patent No.: US 9,929,539 B2
(45) Date of Patent: Mar. 27, 2018

(54) PRECHAMBER SPARK PLUG

(71) Applicant: DKT Verwaltungs-GmbH, Sinsheim (DE)

(72) Inventors: Georg Maul, Bad Wurzach (DE); Steffen Kuhnert, Heidelberg (DE)

(73) Assignee: DKT Verwaltungs-GmbH, Sinsheim (DE)

( * ) Notice: Subject to any disclaimer, the term of this patent is extended or adjusted under 35 U.S.C. 154(b) by 56 days.

(21) Appl. No.: 15/032,501

(22) PCT Filed: Jul. 25, 2014

(86) PCT No.: PCT/DE2014/200355
§ 371 (c)(1),
(2) Date: Apr. 27, 2016

(87) PCT Pub. No.: WO2015/062588
PCT Pub. Date: May 7, 2015

(65) Prior Publication Data
US 2016/0254650 A1    Sep. 1, 2016

(30) Foreign Application Priority Data
Oct. 29, 2013    (DE) .................. 10 2013 221 963

(51) Int. Cl.
*H01T 13/32* (2006.01)
*F02B 19/12* (2006.01)
(Continued)

(52) U.S. Cl.
CPC .............. *H01T 13/32* (2013.01); *F02B 19/12* (2013.01); *H01T 13/36* (2013.01); *H01T 13/467* (2013.01); *H01T 13/54* (2013.01)

(58) Field of Classification Search
CPC ....... H01T 13/54; H01T 13/32; H01T 13/467; H01T 21/02; F02P 13/00; F02P 9/007
See application file for complete search history.

(56) References Cited

U.S. PATENT DOCUMENTS

| 4,416,228 A | 11/1983 | Benedikt et al. |
| 4,926,818 A | 5/1990 | Oppenheim et al. |

(Continued)

FOREIGN PATENT DOCUMENTS

| DE | 2503983 A1 | 8/1975 |
| DE | 3148296 A1 | 9/1982 |

(Continued)

OTHER PUBLICATIONS

German Patent and Trade Mark Office, Office Action for Application No. 102013221963.6, dated Mar. 20, 2014, 4 pages, Germany.

(Continued)

*Primary Examiner* — Long T Tran
(74) *Attorney, Agent, or Firm* — Alston & Bird LLP

(57) ABSTRACT

A prechamber spark plug for igniting a fuel-air mixture in an internal combustion engine, in particular a gas engine, having a spark plug body (1) comprising a prechamber housing (2) and a cap (4) that closes the prechamber (3) at least partially, a ground electrode (10) and a central electrode (7) isolated from the ground electrode and projecting into the prechamber, is designed and developed with simple structural means in order to obtain advantageous igniting properties, the ground electrode (10) being designed for that purpose essentially as a cylindrical pin (11) that can be welded in a passage (12), preferably a bore (12), in the spark plug body (1).

22 Claims, 6 Drawing Sheets

(51) Int. Cl.
*H01T 13/36* (2006.01)
*H01T 13/46* (2006.01)
*H01T 13/54* (2006.01)

(56) References Cited

U.S. PATENT DOCUMENTS

| | | | | |
|---|---|---|---|---|
| 5,554,908 | A * | 9/1996 | Kuhnert | F02B 19/12 123/260 |
| 8,143,772 | B2 * | 3/2012 | Francesconi | H01T 13/54 313/11.5 |
| 8,890,396 | B2 * | 11/2014 | Ernst | H01T 13/54 313/140 |
| 9,083,154 | B2 * | 7/2015 | Niessner | H01T 13/32 |
| 9,093,823 | B2 * | 7/2015 | Sakakura | H01T 13/32 |
| 2005/0268882 | A1 | 12/2005 | Robinet et al. | |
| 2011/0089803 | A1 * | 4/2011 | Francesconi | H01T 13/467 313/11.5 |
| 2011/0148274 | A1 * | 6/2011 | Ernst | H01T 13/467 313/141 |
| 2012/0025689 | A1 | 2/2012 | Kuhnert et al. | |
| 2012/0125287 | A1 * | 5/2012 | Chiera | F02B 19/12 123/254 |
| 2012/0299459 | A1 * | 11/2012 | Sakakura | H01T 13/32 313/141 |
| 2013/0206122 | A1 * | 8/2013 | Chiera | H01T 13/54 123/594 |
| 2014/0165980 | A1 * | 6/2014 | Chiera | H01T 13/54 123/704 |

FOREIGN PATENT DOCUMENTS

| | | |
|---|---|---|
| DE | 8808250 U1 | 12/1989 |
| DE | 3821688 A1 | 1/1990 |
| DE | 10144976 A1 | 4/2003 |
| EP | 2413442 A2 | 2/2012 |
| WO | WO 2007/092972 A1 | 8/2007 |
| WO | WO 2012113002 A1 * | 8/2012 ........... H01T 13/467 |

OTHER PUBLICATIONS

International Searching Authority, International Search Report (ISR) and Written Opinion for International Application No. PCT/DE2014/00355, dated Oct. 30, 2014, 13 pages, European Patent Office, The Netherlands.

International Searching Authority, Written Opinion (English translation) for International Application No. PCT/DE2014/200355, dated Oct. 30, 2014, 4 pages, European Patent Office, Netherlands.

* cited by examiner

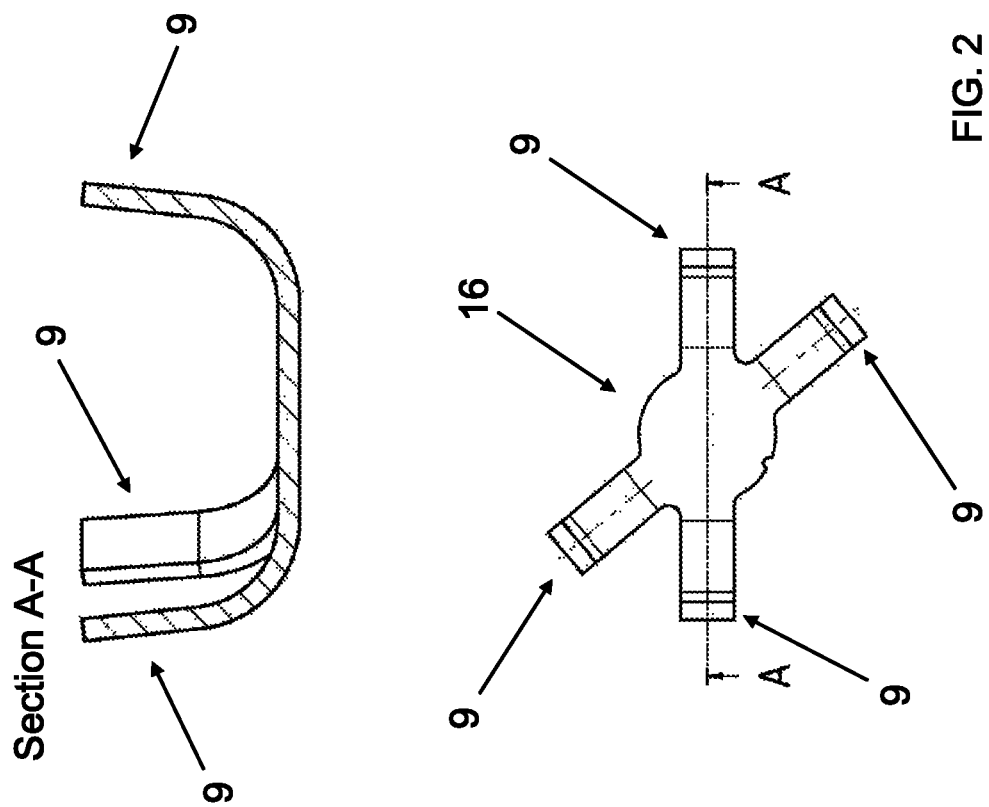
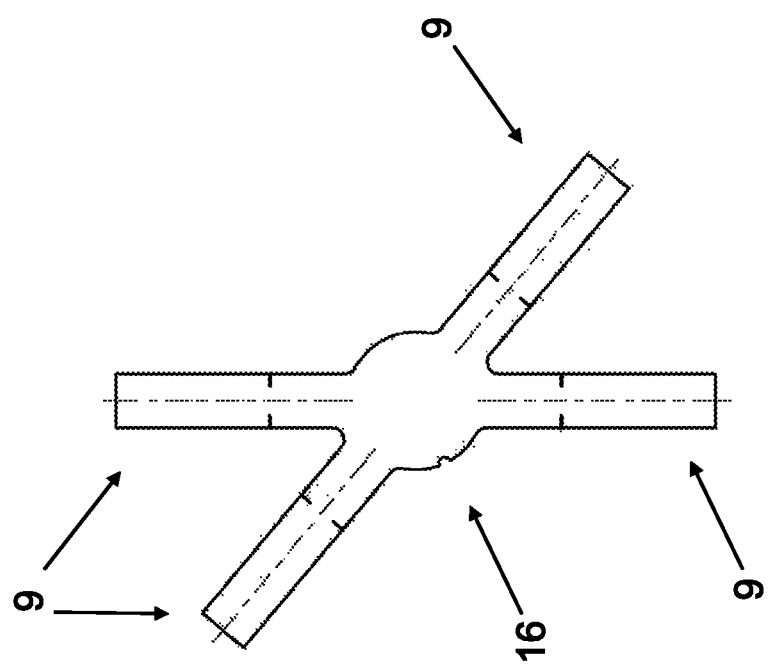
FIG. 2

PRECHAMBER SPARK PLUG

CROSS REFERENCE TO RELATED APPLICATIONS

This application is a national stage application, filed under 35 U.S.C. §371, of International Application No. PCT/DE2014/200355, filed Jul. 25, 2014, which claims priority to German Application No. 10 2013 221 963.6 filed Oct. 29, 2013, the contents of both of which as are hereby incorporated by reference in their entirety.

BACKGROUND

The present invention concerns a prechamber spark plug for igniting a fuel-air mixture in an internal combustion engine, in particular a gas engine, with a spark plug body comprising a prechamber and a cap that closes the prechamber at least partially, with at least one ground electrode and a central electrode isolated from the ground electrode and projecting into the prechamber.

Prechamber spark plugs of the type in question are known from practice. Prechamber spark plugs are special spark plugs for internal combustion engines, which function in accordance with the principle of lean combustion. Prechamber spark plugs exhibit a prechamber that interacts with the combustion chamber of an internal combustion engine via transfer openings. The fuel-air mixture is ignited by an ignition spark in the prechamber, after which combustion proceeds through the transfer openings into the combustion chamber of the internal combustion engine in the form of ignition flares and there ignites the tendentially reluctant to ignite lean mixture.

A prechamber spark plug is known, for example from WO 2007/092972 A1. This spark plug comprises a prechamber provided with a prechamber wall 2 and a cover surface 8. The prechamber wall 2 comprises a cylindrical part 19, to which rectangular ground electrodes 14 are attached by means of likewise rectangular ground electrode carriers 13. Rectangular central electrodes 12, which are attached to a centric central electrode carrier 11, are associated with the ground electrodes 14. Several pairs of ignition surfaces are thus created, with which ignition that is as centralized as possible in relation to the prechamber should take place.

The complex design exhibited by the known prechamber spark plugs, however, is problematic. To begin with, a large number of individual parts have to be manufactured, which moreover have to be attached to one another to provide a corresponding prechamber spark plug. In addition, the complexity of manufacturing for the individual parts of the prechamber spark plug is very high. With respect to the ignition, there is the further disadvantage that ignition does not take place in a sufficiently concentrated manner due to the large-scale of the ignition regions, whereby ignition at one pair of ignition surfaces can take place at a variety of locations. An arc-like "to and fro" of the ignition spark on one pair of ignition surfaces can occur as well.

BRIEF SUMMARY

The present invention is therefore based on the task to design and develop a prechamber of the type mentioned at the outset in such a way that advantageous igniting properties are made possible using simple structural means.

The aforementioned task is inventively solved by the features of the pending claims. According to that, the prechamber spark plug in question is designed and developed in such a way that the ground electrode is embodied as a substantially circular cylindrical pin that can be welded into a passage, preferably a bore, of the spark plug.

In the manner according to the invention, it was first recognized that the manufacturing of a prechamber spark plug can be simplified considerably if the at least one ground electrode is embodied as a cylindrical pin, specifically a substantially circular cylindrical pin. The pin can easily be positioned in a suitable passage, which may be a bore, in the spark plug body. For the purpose of securing it, the pin is weldable. The embodiment in the form of a passage allows access from the "outside", i.e. from the exterior of the spark plug body. The pin can therefore not only be inserted into the passage or the bore from the outside, but can also be welded from the outside. This can be done with a currently commonly used welding method, e.g. TIG, plasma or laser welding, by means of which a quick and easy attachment is realized. Spot welding is also possible for a targeted welding in this context. In its mounted state, the pin is welded into the passage or the bore in the spark plug body.

Therefore, with the prechamber spark plug according to the invention, a prechamber spark plug is specified, in which advantageous igniting properties are ensured with simple structural means.

With respect to the prechamber housing, it is conceivable that this be manufactured of steel. An external thread can also be configured on the outer periphery of the prechamber housing for the purpose of fastening the prechamber spark plug in a corresponding spark plug thread of an internal combustion engine. An insulator, for example a ceramic insulator, which isolates the central electrode from the ground electrode, can be used in the prechamber housing. With respect to the cap, it is conceivable that this is made of nickel.

The passage or the bore can specifically be embodied in the prechamber housing. In other words, the pin acting as the ground electrode can be allocated to the prechamber housing. Within the framework of such a configuration, the pin is welded into a passage, or bore, in the prechamber housing. This can be accomplished with a currently commonly used welding method, e.g. TIG, plasma or laser welding, by means of which the pin can be attached to the prechamber housing. Spot welding can be performed in this context as well. The weld or the weld spot can subsequently be ground, so that an external thread of the prechamber housing, for example, is not damaged. The pin can be mounted in the prechamber housing in such a way that it protrudes from the inner circumferential surface of the prechamber housing, so as to achieve ignition that is away from the wall. This leads to a higher level of combustion efficiency, because the flame is largely able to move freely within the space, and is thus able to spread faster. There is less flame extinction on the wall.

Within the framework of an alternative embodiment, it is conceivable that the passage or the bore is embodied in the cap, in particular in a cylinder casing of the cap. In other words, the pin acting as the ground electrode can be allocated to the cap. Specifically, the pin is welded into a passage or a bore in the cap. Here too, this can be accomplished with a currently commonly used welding method, e.g. TIG, plasma or laser welding, by means of which the pin can be attached to the cap or to the cylinder casing of the cap. Spot welding can be performed in this context as well. To create a smooth surface, the weld or the weld spot can subsequently be ground. With respect to the cap, it is conceivable that it exhibit a sleeve-like shape with a circumferential collar at the open end of the cap, which in the assembled state corresponds to the inner circumferential surface of the prechamber housing. The prechamber housing is, at least to the greatest extent possible, designed to be rotationally symmetrical. With respect to the positioning of the pin in the cap, it is conceivable that the pin is welded into the cylinder casing in such a way that a surface results that, with reference to the inner circumferential surface of the cap, is as flat or flush as possible. A high level of combustion efficiency is achieved here as well because, due to the reduced inner diameter of the cap, a close to center arrangement with reference to the longitudinal axis of the prechamber spark plug is realized. The result is the achievement of spatially largely free, high-speed flame propagation and minimal flame extinction on the wall.

On the side facing the prechamber, the pin can exhibit a platelet, a circular blank or a sphere made of a noble metal. This can be realized in the form of an iridium or platinum alloy. Minimal wear and a long service life of the ground electrode are achieved by the use of such a platelet, such a circular blank or such a sphere. The platelet, the circular blank or the sphere can be welded to the pin. In addition, the platelet, the circular blank or the sphere can correspond in form to the pin, and can be circular in shape. The sphere can be adapted to the pin in its diameter. With respect to the dimensions, to prevent damage during assembly, it is conceivable that the platelet or the circular blank exhibit a smaller diameter than the pin. A diameter of the platelet or circular blank that is 0.1 millimeter smaller than that of the pin, for example, is beneficial. In the case of a sphere, a diameter that is reduced by 0.1 mm in comparison to the pin is advantageous. The pin itself can be made of nickel, steel or a nickel alloy.

Specifically, the pin can be positioned in the radial direction of the prechamber in such a way as to result in a surface that is as flush with the inner surface of the prechamber as possible, or that the pin protrudes into the prechamber by no more than 75 percent of the inner radius of the prechamber. It is also conceivable for the pin to protrude by up to 50 percent of the inner radius of the prechamber. In other words, a near-wall arrangement can be realized, in which the pin or its circular blank, platelet or sphere form a flush surface with the inner wall of the prechamber. In this type of configuration, the ignition gap—described later—can be disposed close to the wall as well. Such an arrangement is advantageous in particular when the pin is allocated to the cap that closes the prechamber at least partially. As an alternative to the near-wall arrangement, an arrangement is also conceivable, in which the pin projects into the prechamber by no more than 75 percent of the inner radius of the prechamber. In other words, a wall-distant arrangement can be realized, in which the pin or its circular blank, platelet or sphere protrudes into the prechamber by up to 75 percent of the inner radius of the prechamber. Such an arrangement is advantageous in particular when the pin is directly allocated to the prechamber housing, because a central ignition of the fuel mixture can hereby be achieved. In this type of configuration, the ignition gap—described later—can be disposed away from the wall as well. The specified inner radius can then refer to the recess in the prechamber housing.

With respect to the number of ground electrodes, it is conceivable that multiple pins inserted in passages or bores are provided as ground electrodes. Two to six pins are conceivable. Due to the configuration of multiple electrode pairs, i.e. a pairing of a central electrode and a ground electrode, reliable ignition can take place even if one pair of electrodes is contaminated.

Specifically, a corresponding central electrode can be allocated to each ground electrode. As previously indicated, a plurality of electrode pairs, i.e. a pairing of a ground electrode with a central electrode, are realized in this manner. In doing so, a ground electrode and a central electrode are directly allocated to one another. The central electrode is embodied in such a way that the spacing between the electrodes decreases towards the ends of the central electrode. A minimum electrode spacing of 0.1 to 0.5 mm is advantageous for the formation of a strong ignition spark.

With respect to the specific design of the central electrode, it can be embodied in the shape of a cross with at least three arms. An embodiment with four or six arms is conceivable as well. The arms can extend from a center point in radial direction. The ends of the arms can be arcuately curved and approach the ground electrode, as discussed above.

Within the framework of an alternative embodiment, the central electrode can be configured in the form of a strip with curved ends. A particularly simple manufacturing of the central electrode is realized hereby, because the strip can be manufactured in a punching process. The strip can subsequently be formed. Specifically, the ends of a substantially round or circular center section can extend radially on both sides. In the end region, the ends are arcuately curved to gradually, similar to a hyperbole, approach the ground electrodes. With such a central electrode, it is conceivable that two pins are provided as ground electrodes corresponding to the number of ends. With respect to the configuration of the central electrode, it is conceivable that it is made of an iridium or platinum alloy.

For robust flame core formation, the central electrode and the pin corresponding to the central electrode, which acts as a ground electrode, can overlap in the prechamber in radial direction. In addition, the central electrode and the corresponding pin can be disposed offset, transverse to the radial direction of the central electrode. A spark gap is thereby created, which can extend in flow direction in the prechamber, i.e. transverse to the radial direction of the central electrode or—in other words—transverse to the radial direction of the prechamber. A flow shadow is achieved with such an arrangement; specifically by the arrangement of the pin relative to the central electrode. By creating a flow shadow, the flow velocity in the area of the spark plug is reduced, so that flow conditions there are calm. This allows the formation of a robust flame core. As the flame subsequently spreads, there is soon contact with the high flow velocity outside the flow shadow and rapid flame propagation develops. As already stated above, the flow shadow is achieved by the arrangement of the pin in relation to the central electrode.

Within the framework of an alternative embodiment, the central electrode and the pin corresponding to the central electrode can be aligned in the radial direction of the central electrode. It is conceivable that a recess is embodied in the pin in the area adjacent to the central electrode. By the shape of the pin, namely by the recess, a flow shadow is achieved here as well. The spark gap can extend transversely to the flow direction in the prechamber, namely in the radial direction of the central electrode. In other words, in relation to the prechamber the ignition gap runs in the radial direction, i.e. "toward the outside". Here too, the flow velocity at the ignition spark is reduced by the flow shadow, so that calm flow conditions occur and a robust flame core can be formed. As the flame spreads following flame core formation, there is soon contact with the high flow velocity outside the flow shadow and rapid flame propagation takes place. This contributes to good combustion as well. Within the framework of this embodiment, it is conceivable that the central electrode and the pin do not overlap, or do so only slightly, in the radial direction, so that a spark gap can be formed.

For the purpose of deflecting the flow, a chamfer can be formed on the side of the pin facing away from the recess. This results in an even more reliable deflection of the flow. Stable flame propagation can be ensured, even when the central electrode and the pin do not overlap, or do so only minimally, in the radial direction of the central electrode.

BRIEF DESCRIPTION OF THE FIGURES

There are thus a variety of possibilities for advantageously embodying and developing the teaching of the present invention. To do this, we refer, on the one hand, to the claims subordinate to claim 1 and, on the other hand, to the following explanation of preferred design examples of the invention by means of the drawing. In conjunction with the explanation of the preferred design examples of the invention by means of the drawing, generally preferred embodiments and refinements of the teaching are also explained. The drawings show FIG. 1 a design example of the prechamber spark plug according to the invention in a partial and partially sectioned side view, FIG. 2 a central electrode, in the form of a strip, of a prechamber spark plug according to FIG. 1 in a variety of views, FIG. 3 a pin of the inventive prechamber spark plug according to FIG. 1 with a circular blank in a side view, FIG. 4 an arrangement of the central electrode and the ground electrode of the inventive prechamber spark plug according to a first design example in a schematic representation, FIG. 5 an arrangement of the central electrode and the ground electrode of the inventive prechamber spark plug according to a second design example in a schematic representation, and FIG. 6 an arrangement of the central electrode and the ground electrode of the inventive prechamber spark plug according to a third design example in a schematic representation.

DETAILED DESCRIPTION OF VARIOUS EMBODIMENTS

Figure 1:
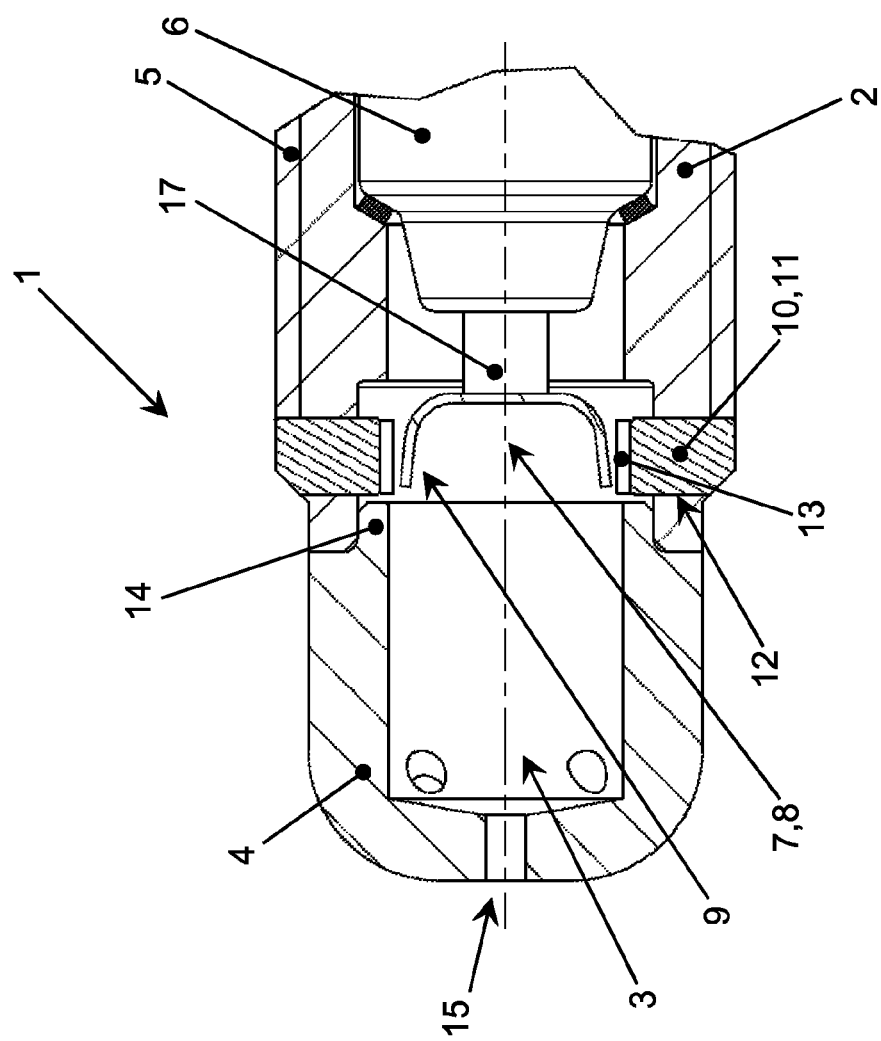

FIG. 1 shows a design example of the prechamber spark plug according to the invention in a partial and partially sectioned side view. The prechamber spark plug comprises a spark plug body 1, which comprises a prechamber housing 2 and a cap 4 that closes the prechamber 3 at least partially. An external thread 5 is embodied on the outer periphery of the prechamber housing 2. The insulator 6, which is accommodated in the prechamber housing 2 and is embodied as ceramic insulator, is partially depicted as well.

Within the prechamber 3, the prechamber spark plug exhibits a central electrode 7. This is embodied in the form of a strip 8 with arcuately curved ends 9. The strip 8 exhibits two ends 9, each acting as a central electrode 7. The strip 8 further consists of an iridium or platinum alloy.

Corresponding to the number of central electrodes 7, the prechamber spark plug comprises two ground electrodes 10, which are embodied in the form of a circular cylindrical pin 11. In the present design example, the pins 11 are welded into passages 12, which are in the form of bores 12. This can be done by spot welding using a conventional welding method, namely by placing a single spot weld. The pins 11 are thus allocated to the prechamber housing 2. On the end facing the prechamber 3 or the central electrode 7, the pins 11 exhibit a welded on circular blank 13. The circular blank 13 is made of a noble metal, specifically in the form of an iridium or platinum alloy.

The cap 4 that closes the prechamber 3 at least partially is cup-shaped, and exhibits a circumferential collar 14 in the contact area with the prechamber housing 2. For propagation of the flame front, there is an opening 15 on end the of the cap 4 facing away from the electrodes.

FIG. 2 shows a central electrode in the form of a strip 8 of a prechamber spark plug according to FIG. 1 in a variety of views. The left illustration in FIG. 2 shows the strip 8, as it can be manufactured in a simple manner, for example, in a punching process. The strip 8 exhibits a round or circular central section 16, from which the two ends 9 extend in radial direction. The two illustrations on the right in FIG. 2 show the strip 8 in an already deformed state, as it is welded to the central electrode section 17 projecting out of the insulator 6 as depicted in FIG. 1. In the ready-to-assemble deformed state, the arcuate ends 9 form an angle greater than 90° with the central section 16 of the strip 8. In this context, an angle of 96°+/−1° has proven to be particularly advantageous.

Figure 3:
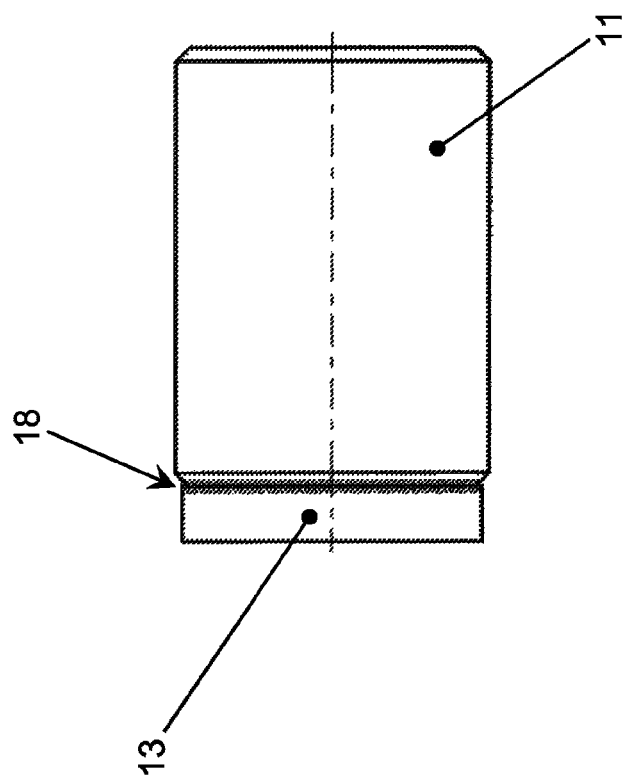

FIG. 3 shows a side view of a pin 11 of the inventive prechamber spark plug according to FIG. 1 with a circular blank. The pin 11 is embodied as a vertical circular cylinder. In addition, as already explained above, the pin 11 comprises a circular blank 13 that is welded to it. This circular blank can also be referred to as a platelet 13. The pin 11 and the circular blank 13 are fixed to one another by means of a weld 18. The pin 11 can consist of steel, nickel or a nickel alloy. The circular blank 13 can be made of an iridium or a platinum alloy.

Figure 4:
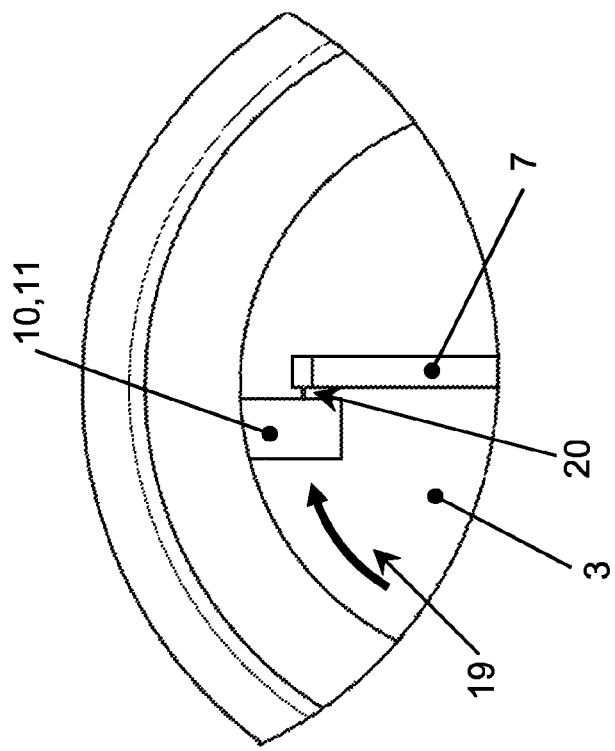

FIG. 4 shows a schematic representation of an arrangement of the central electrode and the ground electrode of the inventive prechamber housing according to a first design example. In this case, the ground electrode 10, which is embodied in the form of a pin 11, and the central electrode 7, which can be an end 9 of the strip 8 or an arm of a cross-shaped central electrode, are disposed offset to one another. The central electrode 7 and the pin 11 overlap in radial direction, but are disposed offset from one another, transverse to the radial direction. The arrow 19 represents a predominant direction of flow within the prechamber 3, which by way of an example flows only in clockwise direction in the present design example. A different flow direction, for example counterclockwise, is conceivable as well. The spark gap 20 extending between the central electrode 7 and the pin 11 is oriented in the direction of flow. The flow shadow created in this manner provides calm flow conditions at the ignition spark and a reduction of the flow velocity in the area of the spark gap 20, so that a robust flame core can form. An adequate flow shadow is achieved with a different orientation of the flow direction as well, which could for example flow counterclockwise in FIG. 4.

Figure 5:
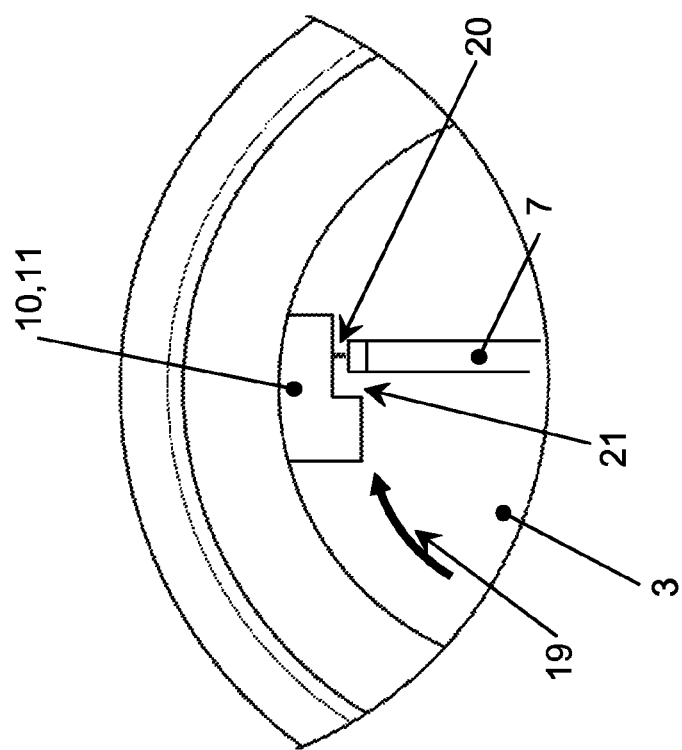

FIG. 5 shows an arrangement of the central electrode and the ground electrode of the inventive prechamber spark plug according to a second design example in a schematic representation. Accordingly, the central electrode 7 and pin 11, acting as the ground electrode 10, are aligned in the radial direction of the prechamber 3. The arrow 19 again illustrates a predominant direction of flow within the prechamber 3, which by way of an example flows only in clockwise direction. To create a flow shadow, the pin 11 exhibits a special shape. A recess 21 is thus embodied in the pin 11, in the area adjacent to the central electrode 7. The pin 11 and the central electrode 7 do not overlap in radial direction, or do so only slightly or partially. The spark gap 20 is aligned in the radial direction of the prechamber. Due to the notch 21, the spark gap extends in the flow shadow, so that calm flow conditions prevail at the ignition spark and the flow velocity is reduced. This provides robust flame core formation and contributes to good combustion.

Figure 6:
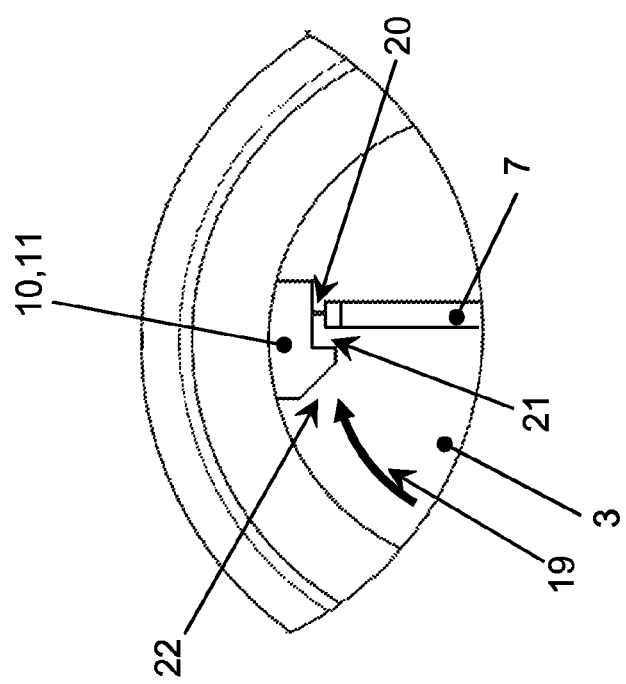

FIG. 6 shows an arrangement of the central electrode and the ground electrode of the inventive prechamber spark plug according to a third design example in a schematic representation. The present design example largely corresponds to the previously described second design example. To avoid repetition, we refer to the previously described second design example of the electrode arrangement, in which the same components are provided with the same reference signs.

Supplementary to the above-mentioned design example, the pin 11 acting as the ground electrode additionally exhibits a chamfer 22. This contributes to an even better deflection of the flow, so that a reliable flow shadow can be formed, even if the central electrode and the pin 11 do not overlap, or do so only slightly, in the radial direction of the prechamber 3. Once again, this supports the development of good combustion.

In the manner according to the invention, it was first recognized that the manufacturing of a prechamber spark plug can be simplified considerably if the at least one ground electrode is embodied as a cylindrical pin, specifically a substantially circular cylindrical pin. The pin can easily be positioned in a suitable passage, which may be a bore, in the spark plug body. For the purpose of securing it, the pin is weldable. The embodiment in the form of a passage allows access from the "outside", i.e. from the exterior of the spark plug body. The pin can therefore not only be inserted into the passage or the bore from the outside, but can also be welded from the outside. This can be done with a currently commonly used welding method, e.g. TIG, plasma or laser welding, by means of which a quick and easy attachment is realized. Spot welding is also possible for a targeted welding in this context. In its mounted state, the pin is welded into the passage or the bore in the spark plug body.

Therefore, with the prechamber spark plug according to the invention, a prechamber spark plug is specified, in which advantageous igniting properties are ensured with simple structural means.

With respect to the prechamber housing, it is conceivable that this be manufactured of steel. An external thread can also be configured on the outer periphery of the prechamber housing for the purpose of fastening the prechamber spark plug in a corresponding spark plug thread of an internal combustion engine. An insulator, for example a ceramic insulator, which isolates the central electrode from the ground electrode, can be used in the prechamber housing. With respect to the cap, it is conceivable that this is made of nickel.

The passage or the bore can specifically be embodied in the prechamber housing. In other words, the pin acting as the ground electrode can be allocated to the prechamber housing. Within the framework of such a configuration, the pin is welded into a passage, or bore, in the prechamber housing. This can be accomplished with a currently commonly used welding method, e.g. TIG, plasma or laser welding, by means of which the pin can be attached to the prechamber housing. Spot welding can be performed in this context as well. The weld or the weld spot can subsequently be ground, so that an external thread of the prechamber housing, for example, is not damaged. The pin can be mounted in the prechamber housing in such a way that it protrudes from the inner circumferential surface of the prechamber housing, so as to achieve ignition that is away from the wall. This leads to a higher level of combustion efficiency, because the flame is largely able to move freely within the space, and is thus able to spread faster. There is less flame extinction on the wall.

Within the framework of an alternative embodiment, it is conceivable that the passage or the bore is embodied in the cap, in particular in a cylinder casing of the cap. In other words, the pin acting as the ground electrode can be allocated to the cap. Specifically, the pin is welded into a passage or a bore in the cap. Here too, this can be accomplished with a currently commonly used welding method, e.g. TIG, plasma or laser welding, by means of which the pin can be attached to the cap or to the cylinder casing of the cap. Spot welding can be performed in this context as well. To create a smooth surface, the weld or the weld spot can subsequently be ground. With respect to the cap, it is conceivable that it exhibit a sleeve-like shape with a circumferential collar at the open end of the cap, which in the assembled state corresponds to the inner circumferential surface of the prechamber housing. The prechamber housing is, at least to the greatest extent possible, designed to be rotationally symmetrical. With respect to the positioning of the pin in the cap, it is conceivable that the pin is welded into the cylinder casing in such a way that a surface results that, with reference to the inner circumferential surface of the cap, is as flat or flush as possible. A high level of combustion efficiency is achieved here as well because, due to the reduced inner diameter of the cap, a close to center arrangement with reference to the longitudinal axis of the prechamber spark plug is realized. The result is the achievement of spatially largely free, high-speed flame propagation and minimal flame extinction on the wall.

On the side facing the prechamber, the pin can exhibit a platelet, a circular blank or a sphere made of a noble metal. This can be realized in the form of an iridium or platinum alloy. Minimal wear and a long service life of the ground electrode are achieved by the use of such a platelet, such a circular blank or such a sphere. The platelet, the circular blank or the sphere can be welded to the pin. In addition, the platelet, the circular blank or the sphere can correspond in form to the pin, and can be circular in shape. The sphere can be adapted to the pin in its diameter. With respect to the dimensions, to prevent damage during assembly, it is conceivable that the platelet or the circular blank exhibit a smaller diameter than the pin. A diameter of the platelet or circular blank that is 0.1 millimeter smaller than that of the pin, for example, is beneficial. In the case of a sphere, a diameter that is reduced by 0.1 mm in comparison to the pin is advantageous. The pin itself can be made of nickel, steel or a nickel alloy.

Specifically, the pin can be positioned in the radial direction of the prechamber in such a way as to result in a surface that is as flush with the inner surface of the prechamber as possible, or that the pin protrudes into the prechamber by no more than 75 percent of the inner radius of the prechamber. It is also conceivable for the pin to protrude by up to 50 percent of the inner radius of the prechamber. In other words, a near-wall arrangement can be realized, in which the pin or its circular blank, platelet or sphere form a flush surface with the inner wall of the prechamber. In this type of configuration, the ignition gap—described later—can be disposed close to the wall as well. Such an arrangement is advantageous in particular when the pin is allocated to the cap that closes the prechamber at least partially. As an alternative to the near-wall arrangement, an arrangement is also conceivable, in which the pin projects into the prechamber by no more than 75 percent of the inner radius of the prechamber. In other words, a wall-distant arrangement can be realized, in which the pin or its circular blank, platelet or sphere protrudes into the prechamber by up to 75 percent of the inner radius of the prechamber. Such an arrangement is advantageous in particular when the pin is directly allocated to the prechamber housing, because a central ignition of the fuel mixture can hereby be achieved. In this type of configuration, the ignition gap—described later—can be disposed away from the wall as well. The specified inner radius can then refer to the recess in the prechamber housing.

With respect to the number of ground electrodes, it is conceivable that multiple pins inserted in passages or bores are provided as ground electrodes. Two to six pins are conceivable. Due to the configuration of multiple electrode pairs, i.e. a pairing of a central electrode and a ground electrode, reliable ignition can take place even if one pair of electrodes is contaminated.

Specifically, a corresponding central electrode can be allocated to each ground electrode. As previously indicated, a plurality of electrode pairs, i.e. a pairing of a ground electrode with a central electrode, are realized in this manner. In doing so, a ground electrode and a central electrode are directly allocated to one another. The central electrode is embodied in such a way that the spacing between the electrodes decreases towards the ends of the central electrode. A minimum electrode spacing of 0.1 to 0.5 mm is advantageous for the formation of a strong ignition spark.

With respect to the specific design of the central electrode, it can be embodied in the shape of a cross with at least three arms. An embodiment with four or six arms is conceivable as well. The arms can extend from a center point in radial direction. The ends of the arms can be arcuately curved and approach the ground electrode, as discussed above.

Within the framework of an alternative embodiment, the central electrode can be configured in the form of a strip with curved ends. A particularly simple manufacturing of the central electrode is realized hereby, because the strip can be manufactured in a punching process. The strip can subsequently be formed. Specifically, the ends of a substantially round or circular center section can extend radially on both sides. In the end region, the ends are arcuately curved to gradually, similar to a hyperbole, approach the ground electrodes. With such a central electrode, it is conceivable that two pins are provided as ground electrodes corresponding to the number of ends. With respect to the configuration of the central electrode, it is conceivable that it is made of an iridium or platinum alloy.

For robust flame core formation, the central electrode and the pin corresponding to the central electrode, which acts as a ground electrode, can overlap in the prechamber in radial direction. In addition, the central electrode and the corresponding pin can be disposed offset, transverse to the radial direction of the central electrode. A spark gap is thereby created, which can extend in flow direction in the prechamber, i.e. transverse to the radial direction of the central electrode or—in other words—transverse to the radial direction of the prechamber. A flow shadow is achieved with such an arrangement; specifically by the arrangement of the pin relative to the central electrode. By creating a flow shadow, the flow velocity in the area of the spark plug is reduced, so that flow conditions there are calm. This allows the formation of a robust flame core. As the flame subsequently spreads, there is soon contact with the high flow velocity outside the flow shadow and rapid flame propagation develops. As already stated above, the flow shadow is achieved by the arrangement of the pin in relation to the central electrode.

Within the framework of an alternative embodiment, the central electrode and the pin corresponding to the central electrode can be aligned in the radial direction of the central electrode. It is conceivable that a recess is embodied in the pin in the area adjacent to the central electrode. By the shape of the pin, namely by the recess, a flow shadow is achieved here as well. The spark gap can extend transversely to the flow direction in the prechamber, namely in the radial direction of the central electrode. In other words, in relation to the prechamber the ignition gap runs in the radial direction, i.e. "toward the outside". Here too, the flow velocity at the ignition spark is reduced by the flow shadow, so that calm flow conditions occur and a robust flame core can be formed. As the flame spreads following flame core formation, there is soon contact with the high flow velocity outside the flow shadow and rapid flame propagation takes place. This contributes to good combustion as well. Within the framework of this embodiment, it is conceivable that the central electrode and the pin do not overlap, or do so only slightly, in the radial direction, so that a spark gap can be formed.

For the purpose of deflecting the flow, a chamfer can be formed on the side of the pin facing away from the recess. This results in an even more reliable deflection of the flow. Stable flame propagation can be ensured, even when the central electrode and the pin do not overlap, or do so only minimally, in the radial direction of the central electrode.

Finally, it is expressly pointed out that the above-described design examples of the prechamber spark plug according to the invention serve only to explain the claimed teaching, but do not limit the claimed teaching to the design examples.

The inveniton claimed is:

1. Prechamber spark plug for igniting a fuel-air mixture in an internal combustion engine, said prechamber spark plug comprising:
    a spark plug body (1) comprising a prechamber housing (2) and a cap (4) that closes the prechamber (3) at least partially, and
    at least one ground electrode (10) and a central electrode (7) isolated from the ground electrode and projecting into the prechamber,
    wherein:
        the ground electrode (10) is embodied as a substantially circular cylindrical pin (11) that is welded into a passage (12) of the spark plug body (1); and
        the central electrode (7) and the pin (11) are aligned in the radial direction of the central electrode (7); and
        a recess (21) is embodied in the pin (11) in a region of the pin (11) adjoining the central electrode (7).

2. Prechamber spark plug according to claim 1, wherein the passage (12) is embodied in at least one of the prechamber housing (2) or the cap (4).

3. Prechamber spark plug according to claim 1, wherein the passage (12) is embodied in a cylinder casing of the cap (4).

4. Prechamber spark plug according to claim 1, wherein on the side facing the prechamber (3) the pin (11) comprises a platelet (13), a circular blank (13) or a sphere made of a noble metal.

5. Prechamber spark plug according to claim 1, wherein on the side facing the prechamber (3) the pin (11) comprises a platelet (13), a circular blank (13) or a sphere made of a an iridium or platinum alloy.

6. Prechamber spark plug according to claim 1, wherein the pin (11) is made of nickel, steel or a nickel alloy.

7. Prechamber spark plug according to claim 1, wherein the pin (11) is positioned in the radial direction of the prechamber (3) in such a way as to result in a surface that is as flush with the inner surface of the prechamber (3) as possible, or that the pin (11) protrudes into the prechamber (3) by no more than 75 percent of the inner radius of the prechamber (3).

8. Prechamber spark plug according to claim 1, wherein multiple pins (11) inserted in passages (12) are provided as ground electrodes (10).

9. Prechamber spark plug according to claim 8, wherein the multiple pins (11) comprise two to six pins (11).

10. Prechamber spark plug according to claim 1, wherein a corresponding central electrode (7) is allocated to each ground electrode (10).

11. Prechamber spark plug according to claim 1, wherein the central electrode (7) is embodied in the shape of a cross with at least three arms.

12. Prechamber spark plug according to claim 1, wherein the central electrode (7) is embodied in the form of a strip (8) with curved ends (9).

13. Prechamber spark plug according to claim 1, wherein the central electrode (7) is made of an iridium or platinum alloy.

14. Prechamber spark plug according to claim 1, wherein the central electrode (7) and the pin (11) in the prechamber (3), which corresponds to the central electrode (7), overlap in radial direction.

15. Prechamber spark plug according to claim 1, wherein the central electrode (7) and the pin (11) in the prechamber (3), which corresponds to the central electrode (7), are disposed offset, transverse to the radial direction of the central electrode (7).

16. Prechamber spark plug according to claim 1, wherein a chamfer (22) is embodied on the side of the pin (11) facing away from the recess (21) for the purpose of deflecting the flow.

17. Prechamber spark plug according to claim 1, wherein the passage (12) is a bore of the spark plug body (1).

18. Prechamber spark plug according to claim 17, wherein the bore (12) is embodied in at least one of the prechamber housing (2) or the cap (4), in particular in a cylinder casing of the cap (4).

19. Prechamber spark plug according to claim 17, wherein the bore (12) is embodied in a cylinder casing of the cap (4).

20. Prechamber spark plug according to claim 17, wherein multiple pins (11) inserted in bores (12) are provided as ground electrodes (10).

21. Prechamber spark plug according to claim 20, wherein the multiple pins (11) comprise two to six pins (11).

22. Prechamber spark plug according to claim 1 wherein the internal combustion engine is a gas engine.

* * * * *